United States Patent
Baker et al.

(10) Patent No.: US 10,951,496 B2
(45) Date of Patent: Mar. 16, 2021

(54) SYSTEM AND METHOD FOR CLOUD-BASED CONTROL-PLANE EVENT MONITOR

(71) Applicant: Threat Stack, Inc., Boston, MA (US)

(72) Inventors: Joe Baker, Burlington, MA (US); Ryan Plessner, Brighton, MA (US); Dan Weiss, Medford, MA (US); Nick Goodwin, Everett, MA (US); Laura Haiduck, Canton, MA (US); Daniel Kirsch, Belmont, MA (US)

(73) Assignee: Threat Stack, Inc., Boston, MA (US)

( * ) Notice: Subject to any disclaimer, the term of this patent is extended or adjusted under 35 U.S.C. 154(b) by 0 days.

(21) Appl. No.: 16/297,059

(22) Filed: Mar. 8, 2019

(65) Prior Publication Data
US 2020/0204465 A1 Jun. 25, 2020

Related U.S. Application Data

(60) Provisional application No. 62/784,643, filed on Dec. 24, 2018.

(51) Int. Cl.
*H04L 12/26* (2006.01)
*H04L 29/08* (2006.01)

(52) U.S. Cl.
CPC .......... *H04L 43/04* (2013.01); *H04L 67/1097* (2013.01); *H04L 67/16* (2013.01)

(58) Field of Classification Search
CPC ...... H04L 43/04; H04L 67/1097; H04L 67/16
See application file for complete search history.

(56) References Cited

U.S. PATENT DOCUMENTS

| | | | |
|---|---|---|---|
| 10,320,813 B1* | 6/2019 | Ahmed | H04L 63/1441 |
| 10,582,488 B2* | 3/2020 | Morioka | H04L 5/0091 |
| 2014/0280893 A1* | 9/2014 | Pfeifer | H04L 43/08 |
| | | | 709/224 |
| 2015/0317169 A1 | 11/2015 | Sinha et al. | |

(Continued)

FOREIGN PATENT DOCUMENTS

KR 10-2018-0002832 A 1/2018

OTHER PUBLICATIONS

Newswire, "Indegy Offers Industrial Cyber Threat Monitoring for HPE Security ArcSight ESM", Jan. 30, 2017 (Year: 2017).*

(Continued)

*Primary Examiner* — Arvin Eskandarnia
*Assistant Examiner* — Chhian (Amy) Ling
(74) *Attorney, Agent, or Firm* — Rauschenbach Patent Law Group, LLC; Kurt Rauschenbach

(57) ABSTRACT

A method for cloud-based, control-plane-event monitoring includes receiving control-plane events from a cloud-based element associated with a first and a second cloud environment. The received control-plane events are ingested from the cloud-based elements associated with the first and second cloud environments to generate a multiple-source data set from the control-plane events from the cloud-based elements associated with the first and second cloud environments. The multiple-source data set is then evaluated based on attributes of the first and second cloud environments in order to generate a common event data set. The common event data set is then processed using a rule set to generate an outcome.

33 Claims, 7 Drawing Sheets

(56) References Cited

U.S. PATENT DOCUMENTS

2017/0359220 A1* 12/2017 Weith .................. G06F 16/25
2018/0176244 A1   6/2018 Gervais et al.
2018/0316729 A1  11/2018 Chauvet et al.

OTHER PUBLICATIONS

"Notification of Transmittal of the International Search Report and the Written Opinion of the International Searching Authority, or the Declaration" for International PCT/US2019/067087, dated Apr. 14, 2020, 10 pages, ISA/KR, Korean Intellectual Property Office, Daejeon, Republic of Korea.

Dennis Reilly, Global Multi-Cloud Management from a Single Interface[online], MORPHEUS, Sep. 19, 2018, https://morpheusdata.com/blog/2018-09-19-global-multi-cloud-management-from-a-single-interface; retrieved Apr. 7, 2020.

* cited by examiner

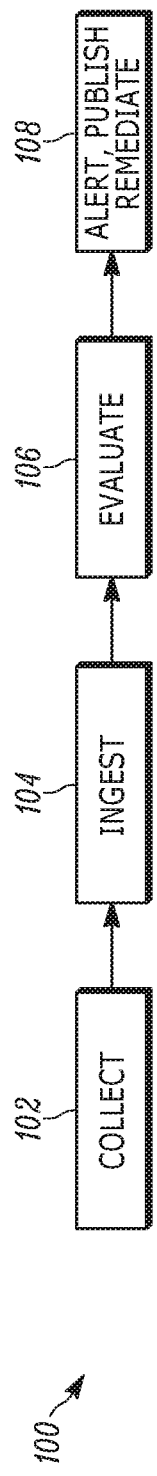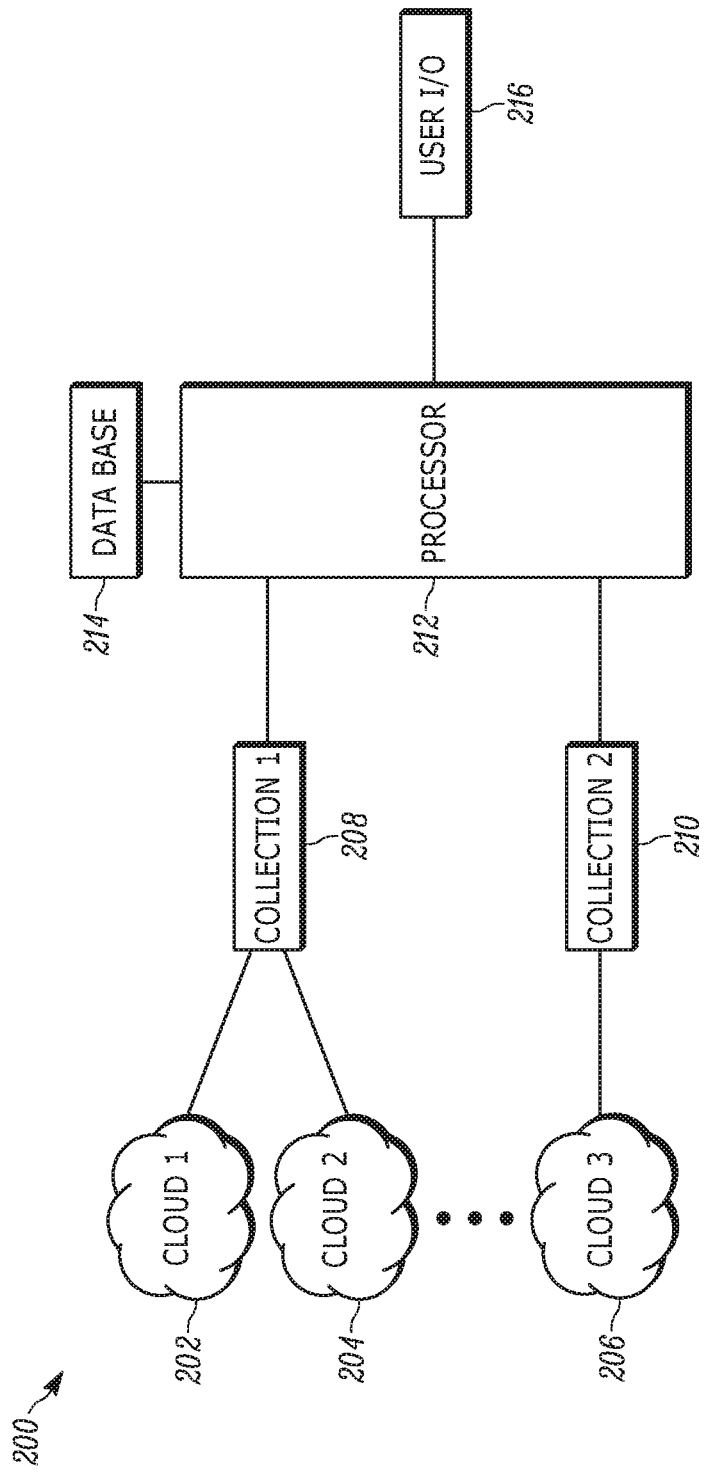

SYSTEM AND METHOD FOR CLOUD-BASED CONTROL-PLANE EVENT MONITOR

The section headings used herein are for organizational purposes only and should not to be construed as limiting the subject matter described in the present application in any way.

RELATED APPLICATION SECTION

The present application is a non-provisional of U.S. Provisional Patent Application Ser. No. 62/784,643, filed Dec. 24, 2018, and entitled "System and Method for Cloud-Based Control-Plane Event Monitor". The entire content of U.S. Patent Application Ser. No. 62/784,643 is incorporated herein by reference.

INTRODUCTION

The movement of data and software applications to the cloud has fundamentally changed the way that computer systems provide software applications and services to users. For example, the network edge of traditional enterprise networks has been replaced by a virtual perimeter, thus changing the way that computers process information and the way that data are accessed by computers. As a result, the ingress and egress point where hardware security appliances and network visibility devices have traditionally been deployed has been eliminated. Not only is the basic processing architecture different in the cloud, but the scale and growth models of processes, applications, and services are also different in the cloud. For example, cloud-based computer system resources can grow and shrink on very rapid time scales. Also, cloud-based computer systems can be highly distributed so tracking and correctly sequencing events is significantly more challenging. Furthermore, security and vulnerability threat models are also necessarily different in cloud-based computer systems as compared to fixed-infrastructure enterprise networks. Consequently, traditional methods and systems that monitor and protect networked information and systems on the cloud are no longer adequate.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

FIG. 1 illustrates the steps of an embodiment of a method of monitoring control plane event data according to the present teaching.

FIG. 2 illustrates a block diagram of an embodiment of a system that monitors control plane event data according to the present teaching.

DESCRIPTION OF VARIOUS EMBODIMENTS

Figure 3:
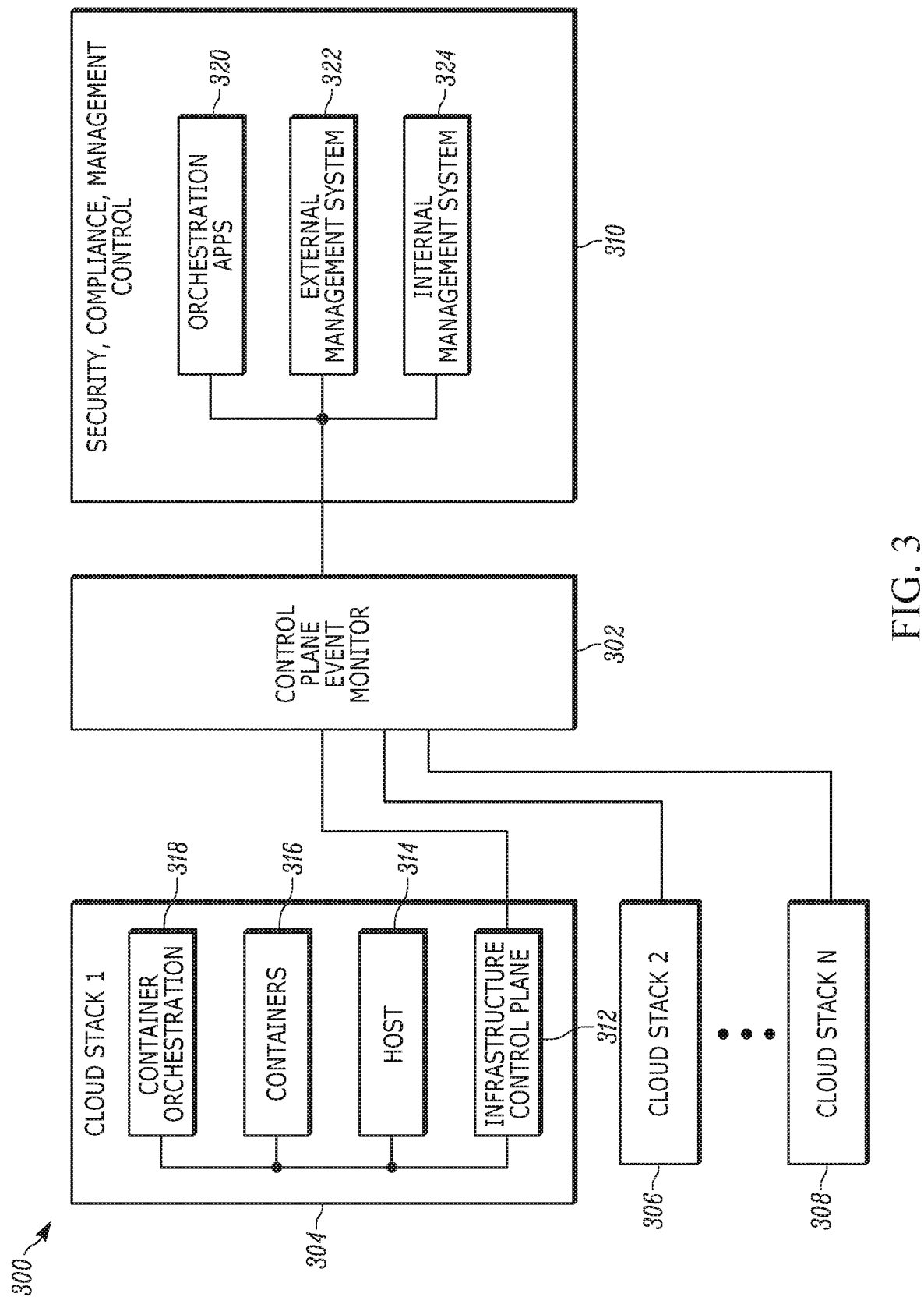
FIG. 3 illustrates an embodiment of a control-plane event monitoring system comprising multiple cloud stacks according to the present teaching.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments as long as the teaching remains operable.

The growing reliance on cloud infrastructure means many organizations utilize cloud resources from multiple cloud providers to make up their cloud-based infrastructure. Thus, the integrity of a computing system and services that run on the cloud-based infrastructure must be ensured even in cases where the infrastructure includes multiple service providers.

Furthermore, it is not sufficient to allocate computer security resources only where sensitive data resides and leave other parts of the infrastructure unsecured or monitored. This approach overlooks less obvious routes to sensitive data that can be exploited by a bad actor. Monitoring the entire infrastructure increases the chances of detecting an attack early and decreases the time to investigate, especially as detecting reconnaissance at the edge of a system becomes increasingly difficult. Because attackers aren't always looking for large amounts of data, rather often they are looking for a small amount of very specific data, it is possible for these threats to go undetected. Data can be extracted by a bad actor by copying and pasting or even taking a screenshot. Consequently, it's important to add multiple layers of monitoring and subsequent threat detection, including monitoring access to the data within a file and not just changes to the file itself.

Thus, new monitoring and security systems and methods are required for the cloud, which are built specifically for cloud-based information systems. Many applications using the cloud, including credit card processing, financial transactions, corporate governance, content delivery, health care, and enterprise network security require monitoring and protecting digital data as well as assurance regarding the integrity of processing that data. Compliance with regulations, reporting and standards, such as Payment Card Industry Data Security Standard (PCI DSS), Health Insurance Portability and Accountability Act (HIPAA), Service Organization Controls (SOC), International Organization for Standardization standards for information security management (ISO 27001), Digital Rights Management (DRM), and Sarbanes-Oxley (SOX) all demand careful and traceable accountability of data as well as convenient data processing and access to data.

Some embodiments of the cloud-based control-plane-event monitoring system and method according to the present teaching are used to monitor cloud, multi-cloud, hybrid and containerized infrastructure for intrusions, anomalies, vulnerabilities, trends, misconfigurations and other items across the host and infrastructure control plane. One key feature is that the system can monitor a common threat that is operating across or persisting on two different cloud environments that are part of the monitored cloud-based infrastructure. Detection of such multi-cloud operation is not possible on known monitoring systems because, for one thing, the events and methods of reporting of various events by the different infrastructures is not uniform. As such, it is not possible to directly correlate, process, compare and/or categorize events received from different cloud environments to generate conclusive policy violations or alert triggers. The method and systems of the present teaching collects, ingests and normalizes received control plane events from more than one cloud environment so that policy violation and/or alerts can be generated. The method and system of the present teaching can also produce actions including changes to processes and reconfigurations of infrastructure, which are based on the policy violations and/or alerts.

Thus, it is highly desirable for cloud-based systems to monitor methods and systems that are capable of monitoring a cloud-based infrastructure that extends across multiple domains including, for example, infrastructure that extends across multiple service providers and/or infrastructure that includes different platforms within a single service provider.

A domain as used herein is a set of cloud-based elements that share a common control plane. Monitoring systems can provide a variety of functions including, for example, tracking the time sequence of events, tracking users, and tracking access to file systems based on roles and/or individual users. Monitoring systems can also provide tracking instances of particular applications, systems, or processes as they migrate across virtual resources in the cloud.

The term "cloud-based element" as used herein can refer to hardware, software and combinations of hardware and software used in the cloud. For example a cloud-based element can refer to software that is running on cloud-based hardware. A cloud-based element can also refer to a hardware device that is located in the cloud. A cloud-based element can also refer to a virtual machine or other virtual computing operation. A cloud-based element can also refer to both software and the hardware-based computing device on which the software is running. Software, as used herein refers to a collection of executable code that provides processes, applications and/or services. In addition, cloud-based elements as used herein can be various services and/or platforms that run on the cloud.

One aspect of the present teaching is a cloud-native monitoring suite of applications that can run on any computing platform, including, for example, virtual machines, servers, desktop, laptop and handheld devices. The computing platforms that execute the system and method of the present teaching may be dedicated or shared.

Another aspect of the cloud-based control-plane event monitoring system of the present teaching is that it can transform control plane events from several public cloud providers into a common format, thereby enabling the evaluation of events according to pre-defined rulesets. To support this evaluation, the cloud-based control-plane event monitoring system of the present teaching transforms control plane events from several services within a particular cloud, or across multiple public cloud providers into a common format, thereby enabling the evaluation of events according to pre-defined rulesets.

Another aspect of the cloud-based control-plane event monitoring system of the present teaching is that is can transform control plane events from cloud-based infrastructure with different control planes. These cloud-based infrastructures can include, for example, public clouds, private clouds, and hybrid (public and private) cloud infrastructures. The transformation of control plane events from different cloud environments allows for identification of a variety of important conditions related to the infrastructure including, for example, vulnerabilities and threats, security events, misconfigurations, unauthorized accesses, policy violations and other conditions that occur within and across the multiple monitored cloud environments.

The computer industry has recently observed bad actors using increasingly sophisticated malicious techniques on the public cloud. The threats generated by these bad actors leverage the unique characteristics of cloud services and deployment models to launch or hide their breaches. In simple attacks, for example, bad actors steal access keys and look for a direct path to sensitive data or valuable resources, such as an open S3 bucket or the ability to launch a new EC2 to mine crypto currency. In more sophisticated attacks, the bad actors present threats that incorporate multiple steps and can traverse the target's infrastructure. These threats can move back-and-forth from the cloud infrastructure control plane to the host. Threats can also migrate from infrastructure used by a target that is managed by one cloud provider (a first cloud environment) to infrastructure used by the target that is managed by a second cloud provider (a second cloud environment). In some cases, many different cloud environments can be involved. Examples of different cloud environments include Amazon AWS cloud, Microsoft Azure cloud, Google cloud, etc. Private and public/private clouds may also be cloud environments that are part of an attack.

It should be understood that a distinct cloud environment is one in which a distinct control plane is used to manage and control the cloud-based elements within the cloud environment. Thus, two different cloud environments can include two sets of cloud-based resources that reside in two different service providers and/or two different cloud environments that include two sets of cloud-based resources that each reside in a different service domain that is owned by the same service provider.

Many service providers offer cloud-based elements that include an array of compute, storage, database, networking, and cloud migration services. In addition, a variety of cloud-based elements, such as tools and applications like search, load balancing, and software development tools are available. Amazon Web Services (AWS) offers multiple services including elastic compute cloud (EC2), relational database service (RDS), simple storage service (S3). Amazon also offers services, such as identity and access management (IAM). Likewise, Google offers cloud services, sometimes referred to as Google Cloud. These and other service providers offer a variety of cloud storage services, including managed databases, object, block, and file storage.

Many of these services, or collections of these services, include a control plane that generates events related to actions taken on or within the particular service, even if they are run by the same service provider. In other cases, a control plane surrounds a suite of resources and services. As such, a particular cloud environment is one in which a separate control plane is used for the service, even if the service is offered by a common service provider. Services that run on different service providers, such as Amazon, Google, Microsoft and others, use separate control planes, and therefore are also considered different cloud environments. An advantage of using control plane events as part of a system and method of monitoring infrastructure is that control plane events typically include both data plane events and management events. As such, control plane events provide a large amount of information about a cloud-based environment and how and why the hardware, software and services of the cloud-based environment changes over time.

A complication in monitoring multiple cloud environments is that each cloud provider utilizes different and varying data formats, information content, and attributes for control plane events. Each cloud provider can also utilize different export methods for control plane events. These differences make it difficult to unify and compare changes of infrastructure across different cloud providers in a uniform manner. Likewise, different platforms within a particular cloud provider can operate using a different control plane and/or can comprise events that are encapsulated in varying data formats and export methods. Thus, these different cloud environments require that the events provided by their control planes be ingested and normalized in order to present a unified picture of what is happening on the infrastructure.

The control-plane event monitoring system and method of the present teaching allows organizations to monitor and act on infrastructure activity for a cloud-based infrastructure that extends across multiple cloud providers and platforms from a single viewpoint. In some embodiments, each cloud provider and/or platform monitors and maintains their user's infrastructure in a proprietary manner. Also, each cloud provider and/or platform lets users receive and/or view the infrastructure and associated events in a variety of ways. For example, users can view various consoles, web access, and/or APIs. When an end user is maintaining a cloud-based infrastructure that includes cloud elements from multiple cloud providers and/or cloud elements from multiple platforms, the viewing of the infrastructure involves using several disparate tools to view and monitor a cross provider and, in some cases, cross-platform infrastructure. The control-plane event monitoring system and method of the present teaching can eliminate the need for the multiple views.

One feature of the control plane event monitoring system and method of the present teaching is that it unifies disparate monitoring of known systems into a common view that is able to provide outputs that are useful to a user, including generating alert outputs and determining policy violations as output. That is, various embodiments of the control plane event monitoring system and method of the present teaching unify cloud-based event collection from different control planes associated with different cloud service providers and/or cloud platforms so that they can be processed to generate event-based alerts and policy violations that cross these service providers and/or platforms.

FIG. 1 illustrates the steps of an embodiment of a method 100 of monitoring control plane event data according to the present teaching. In a first step 102, cloud provider and/or platform event data is collected. This collection step 102 may involve passive receiving and various other methods of receiving and/or retrieving of control plane event data. This collection step 102 may involve retrieving the event data, e.g. from a web site, database or other repository. A large variety of event data may be collected in the collection step 102 of various embodiments of the method. The control plane event data includes, for example, information about changes in infrastructure, adding/removing instances, audit configuration, permission changes, user changes, policy changes, and/or access changes. Event data can also include, for example, metrics about cloud resources such as CPU usage, disk I/O, memory, network traffic, application errors, application status, workload status, instance status and other events associated with operation of cloud resources, cloud services, and cloud applications. The control plane event data can include the information provided by large public cloud providers, such as Amazon CloudTrail, various Google Cloud APIs, Microsoft Azure and others.

The control plane event data can be collected in numerous ways. For example, the control plane event data can be read from a file. The control plane data can also be received from a network. The control plane event data can also be requested from a cloud provider by a processor implementing a collection step 102 of the method and/or the control plane data can be sent by the cloud provider to a processor executing a collection step 102 of the method 100. The control plane event data can be provided or retrieved at particular times and/or the control plane event data can be provided or retrieved on a near-real-time basis. In some embodiments, the collection step receives information from a software agent. Also, in some embodiments, the collection step receives information from an operating system.

In a second step 104, the collected data is ingested to form a multiple-source data set. Ingested data is data that is brought into the platform that is executing the various steps 100 of the method to form a multiple-source data set that can be further processed in later steps. For example, a file may be received by the collector in the collection step 102 and then in the ingestion step 104 the file is read into the processor in the ingestion step 104 and combined with other collected data to produce the multiple-source data set.

In a third step 106, the multiple-source data set is evaluated against a set of rules and policies. This evaluation includes, for example, comparing distinct properties, categorizing like properties into a single property, and/or normalizing event data. The normalization of the event data is based on the known attributes of the event data that is generated by the distinct control plane of each cloud source. The evaluation step 106 results in unifying the collected event data in the multiple-source data set into a common event data format that is compatible with downstream event processing. This evaluation process uses key known attributes (format, content, etc.) of control plane events for each specific control plane so that it is possible to find, e.g., common event types and complementary event types, thus allowing conversion of control plane events from multiple sources into common events. Some embodiments of the evaluation step 106 result in unifying events in the collected event data by taking events from two sources with similar properties and combining them into a common property. This data generated by the third step 106, and used in subsequent processing, is referred to as common event data.

For example, a description of instances from two different service provider clouds can be contained in "describe instance" events from each provider in two different formats and/or including different fields and/or different data. The multiple-source data resulting from the ingestion step 104 for "describe instance" events from these two sources will contain the "describe instance" events as they are received. In the evaluation step 106, the multiple-source data is processed such that these two "describe instance" events are rendered into two events in a common structure with the same fields and data is transformed from the original control plane event into this common event structure. This allows the instance descriptions for both clouds to be further processed using the common event structure.

In a fourth step 108, the common event data is processed in downstream event processing that performs a number of tasks. For example, the fourth step 108 may generate alerts, identify policy violations, publish reports, remediate threats and/or modify non-compliant infrastructure into compliant configurations. The processing in step four 108 of the common event data results in alerts and or policy violations that enable users to make decisions or to take actions. The processing in step four 108 of the common event data can also result in automatic changes to processes and/or configuration or reconfigurations of cloud-based elements to remediate various issues associated with the alert or policy violation.

The result of the fourth step generates computer processes that enable alerting, reporting and analysis for an end user. The results can, for example, produce changes in infrastructure configurations, compliance assurance, establishment of vulnerabilities and threats. The processing step four 108 can include a series of processing steps that each produce specific processed data and synthesized information that are derived from the common event data. This can be referred to as a pipeline processor architecture, which has the advantage that the processing may be applied in any order, because the output of each pipeline stage that feeds the next stage is the common event data. The pipeline processor can, for example, be the pipeline processor disclosed in U.S. patent application Ser. No. 15/846,780, filed on Dec. 17, 2017 and entitled "System and Method For Cloud-Based Operating System Event and Data Access Monitoring", which is assigned to the present assignee. Each stage can also produce refined common event data. Various stages of the processing step four 108 can produce, for example, raw event logs, alerts and notifications based on events that satisfy customizable rule sets, vulnerability and exploitation analyses, identification of security threats and vulnerabilities, as well as archives of time-sequenced raw event logs.

FIG. 2 illustrates a block diagram of an embodiment of a system 200 that monitors control plane event data according to the present teaching. Multiple cloud environments, cloud 1 202, cloud 2 204, and cloud 3 206 are connected to collection systems 208, 210. Cloud 1 202 and cloud 2 204 are connected to collection system 1 208. Cloud 3 is connected to collection system 2 210. The collection systems 208, 210 received control plane events from the cloud environments 202, 204, 206. In various embodiments, the number of cloud environments and collection systems varies.

The collection systems 208, 210 are connected to a processor 212. The processor can take the form of a variety of processor systems. For example, the processor 212 can be a single processor or multiple processors. The processor 212 can be hardware based or the processor may be a virtual machine processor. The processor 212 can also be a cloud-based processor. For example, the processor 212 can be a service that can run on a cloud infrastructure. In some embodiments, the processor 212 is connected to a database 214. The database 214 can be a single database or the database can include multiple databases. The database(s) 214 can include customer data, infrastructure data, policy data, and/or vulnerability data. The database(s) 214 can be private or public databases. In some embodiments, the database 214 is the National Vulnerability Database.

The processor 212 is connected to one or more user input/output devices 216. The user input/output device(s) 212 can include, for example, a web site, a computer, an application, a management system, or any of a variety of known devices for managing and/or monitoring and/or modifying and/or operating cloud infrastructure. For simplicity, FIG. 2 illustrates only a subset of possible elements of the monitoring system of the present teaching. Some embodiments of the monitoring system 200 comprise a large-scale system with numerous other cloud environments, collectors databases, processors and user I/O.

Referring to both FIGS. 1 and 2, the processor 212 executes some or all of the steps of the method 100. The cloud environments 202, 204, 206 generate control plane event data that is received and/or retrieved in step one 102 by the collectors 208, 210. The processor 212 executes in various embodiments all or part of the ingestion step two 104 and/or the evaluation step three 106. The processor 212 can also execute step four 108 downstream of the common event data processing and generate alerts and other outputs. The processor 212 can also use information retrieved from the database 214 and/or retrieved from any of the results of the ingestion step two 104, the evaluation step three 106, and the alert step 108. The processor 212 sends the results of the downstream processing of common event data to the user I/O 216. In some embodiments, the user I/O performs some or all of the processing step four 108.

In some embodiments, one or more of the collectors 208, 210 is a collection processor that is part of processor 212. In some embodiments, the processor 212 includes an ingestion processor that performs the ingestion step two 104, an evaluation processor that performs the evaluation step three 106, and a processor that executes at least some of the processing in step four 108. These various processors may be the same or different physical and or virtual processors.

FIG. 3 illustrates an embodiment of a control-plane event monitoring system 300 comprising multiple cloud stacks according to the present teaching. A control plane event monitor processor 302 is connected to multiple cloud stacks 304, 306, 308. A cloud stack is a set of cloud-based elements including computer resources, services, application and/or functions that are being used and/or controlled by a user. Thus, a cloud stack represents a cloud environment to the monitoring method and system of the present teaching. In some embodiments, the user of the cloud stack is an IT organization of a business, but a variety of users, including human and machine-based users are possible. Various embodiments of the control-plane event monitoring system 300 connect the control plane event monitor 302 to various numbers of cloud stacks 304, 306, 308.

One feature of the system and method of the present teaching is that it provides a unified picture of a cloud-based infrastructure of a user, even when the cloud-based elements of that infrastructure reside in different cloud environments. Thus, in some embodiments, a particular application or function, or suite of applications and/or functions, are consumed by a user and utilize cloud-based elements in all of the cloud stacks 304, 306, 308. In various embodiments, the particular application or function, or suite of applications and/or functions, are monitored and/or secured. Also, in various embodiments, the particular application or function, or suite of applications and/or functions is checked for compliance. Also, in various embodiments, an end system 310 manages the particular application or function, or suite of applications and/or functions.

An output of the control plane event monitor processor 302 is connected to the end system 310. In some embodiments, the end system 310 belongs to a customer that is using the cloud-based elements in the cloud stacks 304, 306, 308. As an example, cloud stack 304 includes a control plane 302 that performs management and control for the services that are provided by the cloud-based elements in the cloud stack 304. The control plane 312 performs, for example, security services and management of the authorization and authentication of users accessing applications. The control plane 312 can also control run time components and manage their life cycle. The control plane 312 can also perform hardware and software load balancing and route service requests to the appropriate cloud-based element. The control plane 312 can also manage scheduled tasks and jobs. In addition, the control plane 312 can store system files associated with services.

One feature of the control plane 312 described herein is that it touches many aspects of a given operation that is performed using multiple levels of the cloud stack 304. Therefore, control plane events produces by the control plane 312 provide a rich source of information about the ongoing activities in a cloud stack 304. However, control plane events produced by one cloud stack 304 are different from control plane events produced by a control plane in a different cloud stack. Differences arise, for example, in access methods, format, contents, captured events, sequencing, telemetry, logging, alerting, storing, error handling and other features of events provided by the various control planes.

As an example, cloud stack 304 includes a host 314. The host 314 is a physical computer server and/or one or more associated operating systems which run services and applications. That is, a host 314 may be a virtual machine and/or a physical machine. A container 316 is a defined unit of software that contains everything necessary to run an application. Multiple containers 316 often run on a host 314. An application can run on multiple containers 316. A container orchestrator 318 is used to organize multiple containers. Control plane 312 of cloud stack 304 generates control-plane events when any element 312, 314, 316, 318 at any level of the stack is used. The elements 312, 314, 316, 318 represent one example of a cloud stack 304. It should be understood that the control-plane event monitor system and method of the present teaching can operate with a variety of other known cloud stacks that include various other different elements. For example, the elements of one cloud stack can be different than the elements of other cloud stacks.

The end system 310 performs one or more of a number of cloud resource visibility and management functions using the output of the control plane event monitor processor 302. For example, the end system 310 can include orchestration applications 320 that arrange and/or coordinate the various automated tasks available from the elements of a cloud environment. The end system 310 can also include an external management system 322 that is part of a third-party trusted detection and response partner that helps an organization with management of their cloud-based infrastructure. The end system 310 can also include an internal management system 324 that directly manages and controls the cloud-based infrastructure.

Figure 4:
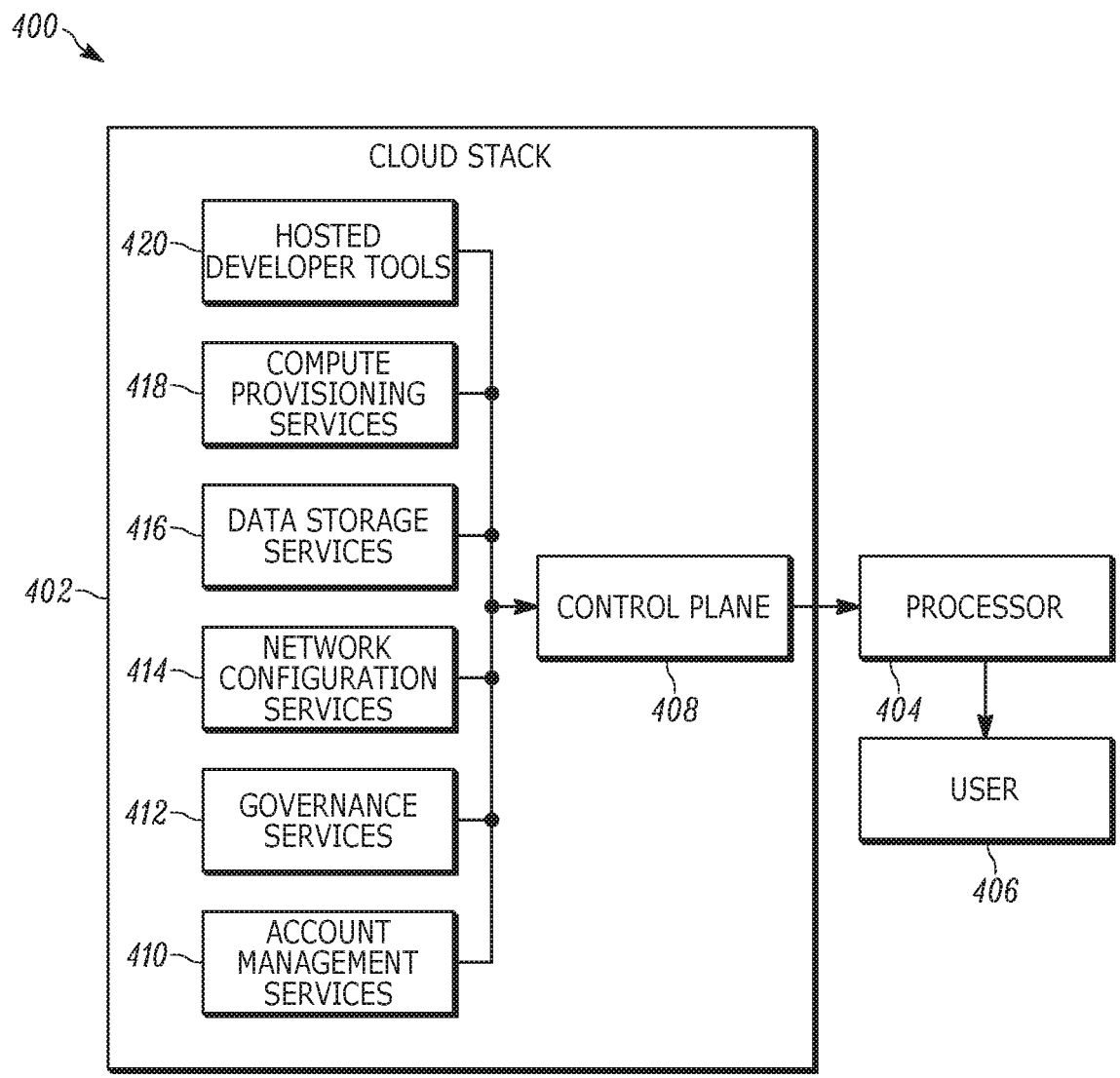
FIG. 4 illustrates an embodiment of a control-plane event monitoring system comprising a cloud stack that includes multiple cloud-based tools and services according to the present teaching.

FIG. 4 illustrates an embodiment of a control-plane event monitoring system 400 comprising a cloud stack that includes multiple cloud-based tools and services according to the present teaching. The cloud stack 402 provides inputs to the control-plane event monitoring processor 404 that provides common event data to an end user system 406. The cloud stack 402 is just one of multiple possible cloud stacks that can be connected to the control-plane event monitoring processor 404. Referring to FIGS. 3 and 4, in some embodiments, the cloud stack 402 can be the same as cloud stack 306 and end user system 406 can be the same as end system 310 that were described in connection with FIG. 3.

The control plane 408 in the stack 402 provides event information from account management services 410, governance services 412, network configuration services 414, data storage services 416, compute provisioning services 418, and hosted developer tools 420 to the control-plane event monitoring processor 404. The control-plane event monitoring processor 404 then generates common event data and provides that event data to the end user system 406. The common event data can also be further processed, either by the control-plane event monitoring processor 404 or another processor, to generate alerts and/or to determine violations of policy. These alerts and/or determined policy violations are supplied to an end user system 406. In some embodiments, the processor 404 generates common event data and the end system 406 generates the alerts and determines policy violations or other outcomes.

Referring to FIGS. 3 and 4, the generated alerts and/or determined policy violations or other processed outcomes can be derived by processing one or more control plane events generated by cloud stack 304 and one or more control plane events generated by cloud stack 402. Thus, an alert or violation is generated based on information from two different clouds.

As described herein, the normalization of control plane events produces common event data from multiple different control planes. Common event data typically includes various attributes such as an event ID, the event feed, the event type, and the event source. In some embodiments common event data include attributes such as region, edge location and/or availability zone associated with the event. Common event data can include information, such as IP addresses and other networking parameters. Also, common event data can include account numbers, organization identifiers, users and user roles. Also, common event data can include event time and other attributes related to timestamps associated with an event. Additional attributes of common event data are associated with the particular type of event.

In some embodiments of the method of the present teaching, control plane event data from two different events representing the same kind of activity provided by a particular control plane is converted into a single event in the common event data. In some cases, a single event from a particular control plane is converted into more than one event in the common event data. In some methods, a common event represents information from more than one control plane event.

For example, referring to FIG. 4, the following control plane events can be received by the processor 404 from the control plane 408: 1) eventName, "DescribeInstances"; 2) eventName, "GenerateDataKey"; 3) eventName, "GetStackPolicy"; 4) eventName, "DescribeInstanceHealth"; 5) eventName, "AssumeRole"; 6) eventName, "DescribeLifecycleHooks"; 7) eventName, "DescribeVolumes"; 8) eventName, "DescribeSnapshots"; 9) eventName, "ListResourceRecordSets"; and 10) eventName, "DescribeAutoScalingGroup". For each of these named events, the processor 404 converts an event provided by the control plane 408 into an associated normalized event that is part of the common event data. These events are described in the context of AWS CloudTrail, but extension to other control planes is straightforward.

Figure 5:
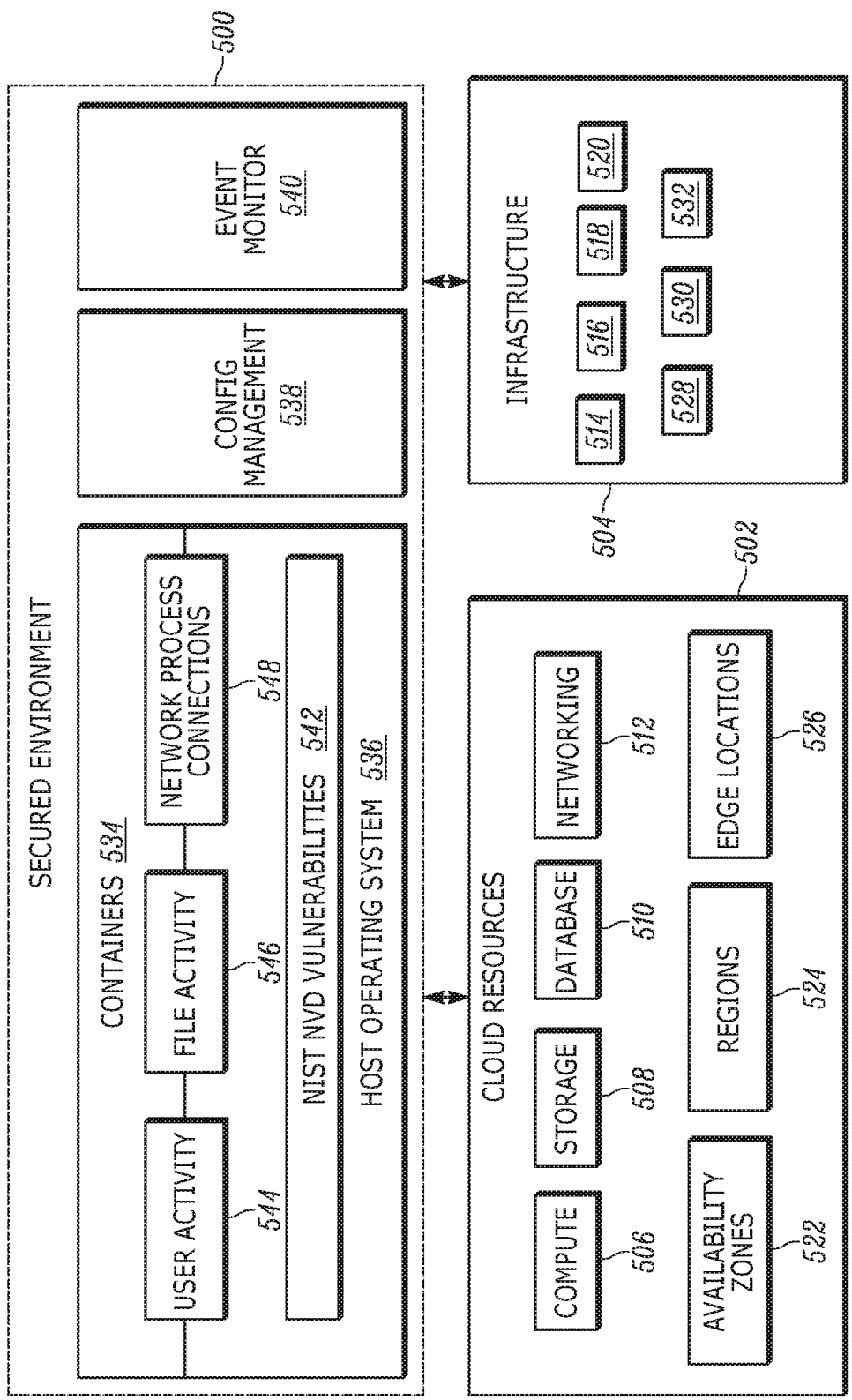
FIG. 5 illustrates a secured cloud-based environment that runs infrastructure that includes cloud resources from two different cloud service providers.

FIG. 5 illustrates a secured cloud-based environment 500 that runs infrastructure which includes cloud resources from two different cloud service providers 502, 504. Cloud resources for the first cloud service provider 502 include compute processors 506, storage 508, database 510 and networking 512. Similarly, cloud resources for the second cloud service provider 504 include compute processors 514, storage 516, database 518 and networking 520. Infrastructure for the first cloud service provider 502 includes availability zones 522, regions 524, and edge locations 526. Similarly, infrastructure for the second cloud service provider 504 includes availability zones 528, regions 530, and edge locations 532. The secured environment 500 includes containers 534 that run on a host operating system 536, configuration management 538, and event monitoring 540. To provide the secured environment 500, a number of functions are tracked. This includes, for example, user activity 544, file activity 546 and network process connections 548. The NIST National Vulnerability Data Base (NVD) vulnerabilities 542 are also tracked. Configuration management 538 and a control plane event monitor 540 processes are used to provide the secured environment 500. The control plane event monitor 540 processes control plane events from the two different cloud service providers 502, 504 and generates common control plane events. The control plane event monitor 540 further processes the common control plane events to generate a track of user activity 544, a track of file activity 546 and/or a track of network process connections 548. The control plane event monitor 540 further processes the common control plane events using the NIST National Vulnerability Data Base (NVD) vulnerabilities 542 to determine known vulnerabilities that affect the secured environment 500. The control plane event monitor 540 generates alerts and determines vulnerabilities based on processed common control plane events, including alerts and vulnerabilities that result from events in both of the two different cloud service providers 502, 504. This information can be sent to the configuration management 538 to reconfigure resources based on the information provided by the control plane event monitor 540.

One feature of the system and methods of the present teaching is that it is able to uncover threats and/or activities in one cloud environment that have an impact on threats and/or activities in another. Additionally, actions monitored in one environment can be assessed as benign within that environment, and yet have important consequences in another environment if the two environments are part of a common cloud infrastructure. Known systems monitor only one cloud environment and perform processing on events that are only related to that environment. Such known systems miss activities that cross the environments. For example, changing access levels anywhere in one environment can potentially open a hole in another environment. In addition, a breach can be detected that is happening in two cloud providers at the same time. Such a breach may not even be detected by monitoring each domain separately, and can be detected and remediated sooner by monitoring and processing common event data from both environments.

Figure 6A:
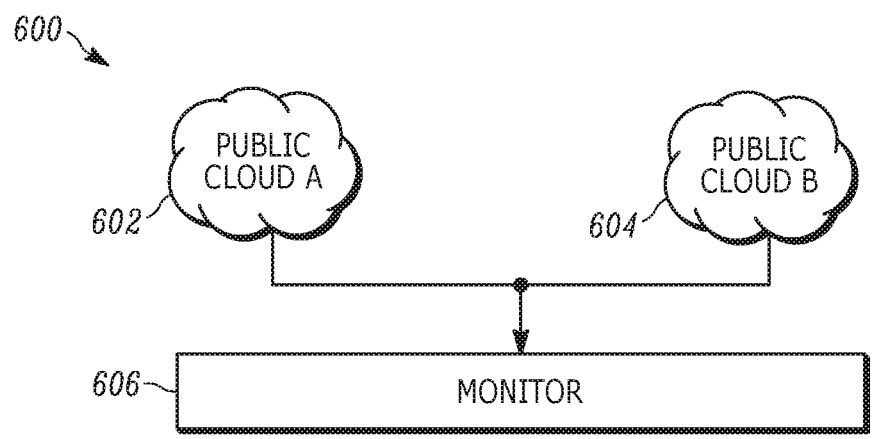
FIG. 6A illustrates a point in an attack on a cloud infrastructure comprising two cloud-based environments that is detected using an embodiment of the control-plane event monitoring processor according to the present teaching.

FIG. 6A illustrates a point in an attack 600 on a cloud infrastructure comprising two cloud-based environments 602, 604 that is detected using an embodiment of the control-plane event monitoring processor 606 according to the present teaching. Control planes (not shown) in each of a first public cloud 602 and a second public cloud 604 connect to the control plane event monitoring processor 606. The control planes provide event data to the processor 606 from their respective cloud environments 602, 604.

Figure 6B:
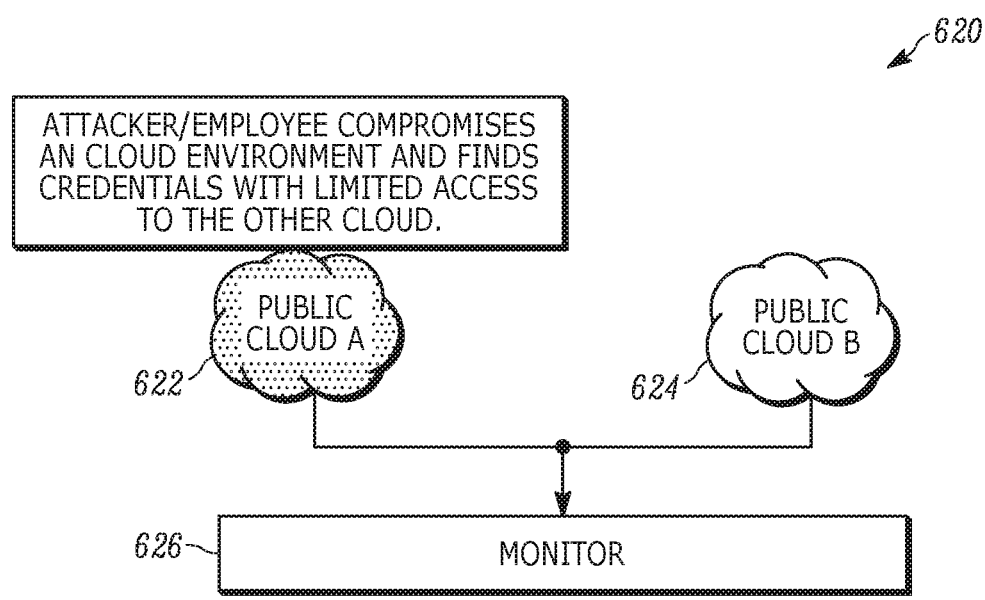
FIG. 6B illustrates a second point in the attack on the cloud infrastructure comprising two cloud-based environments that is detected using the embodiment of the control-plane event monitoring processor described in connection with FIG. 6A.

FIG. 6B illustrates a second point in the attack 620 on the cloud infrastructure comprising two cloud-based environments 622, 624 that is detected using the embodiment of the control-plane event monitoring processor 626 described in connection with FIG. 6A. At this second point 620 processes in the first cloud environment 622 have evolved as the result of a bad actor, which may be an attacker and/or an employee compromising the cloud-based environment 622 by finding credentials that also provide limited access to the other cloud-based environment 624. The control plane in the first cloud environment 622 will generate events associated with this compromise that are provided to a control-plane event monitoring processor 626 that is to updated. In some embodiments, such events may be, for example, events associated with an access control process in the first cloud environment 622.

Figure 6C:
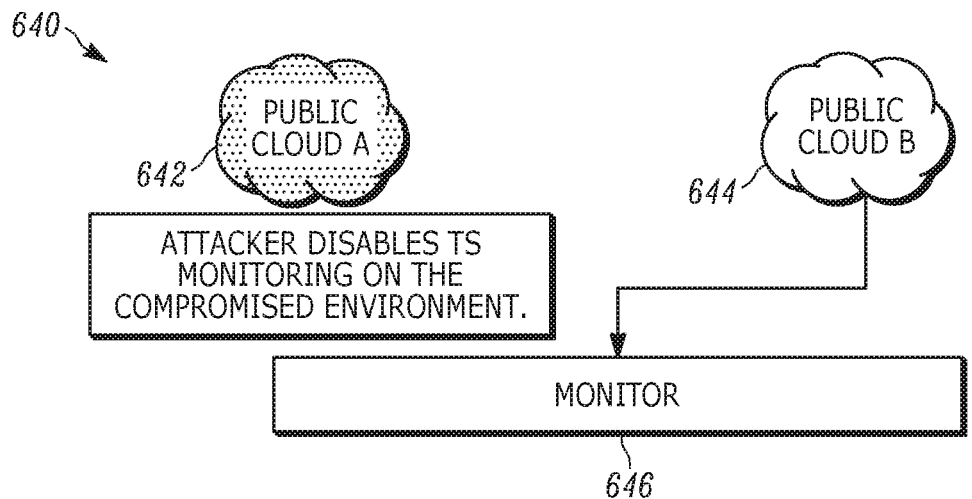
FIG. 6C illustrates a third point in the attack on the cloud infrastructure that comprises two cloud-based environments that is detected using the embodiment of the control-plane event monitoring processor described in connection with FIG. 6A.

FIG. 6C illustrates a third point in the attack 640 on the cloud infrastructure that comprises two cloud-based environments 642, 644 that are detected using the embodiment of the control-plane event monitoring processor 628 described in connection with FIG. 6A. At this third point 640, processes in the first cloud environment 642 have evolved as the result of the bad actor now disabling the monitoring on the cloud-based environment 642. This disabling activity limits the visibility into the first cloud environment 642 so that known event monitoring schemes, either data plane schemes or control plane schemes that monitor only one environment are ineffective. Now, only control plane events from the second cloud environment 644 that are received by the control-plane event monitoring processor 648 will generate events associated with the attack.

Figure 6D:
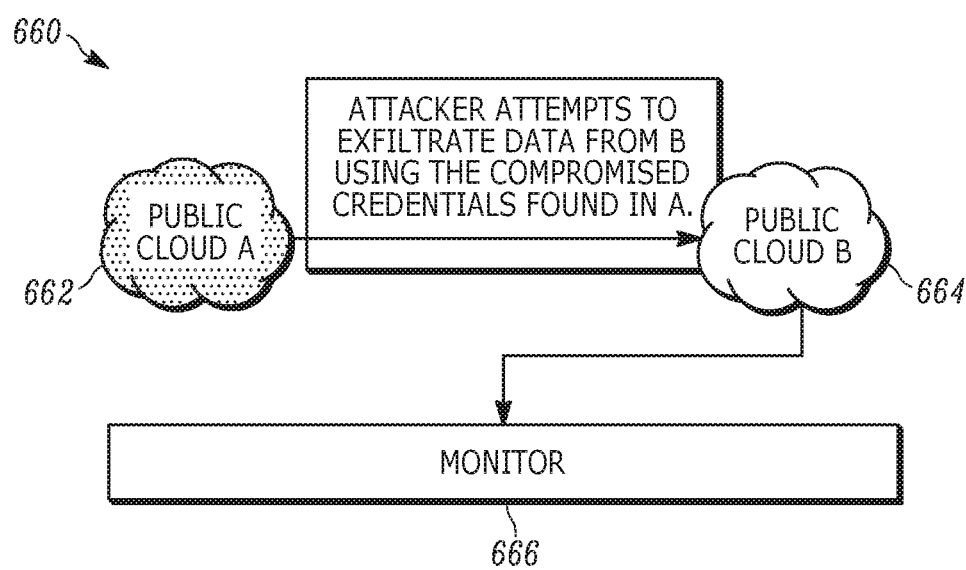
FIG. 6D illustrates a fourth point in the attack on the cloud infrastructure that comprises two cloud-based environments that is detected using the embodiment of the control-plane event monitoring processor described in connection with FIG. 6A.

FIG. 6D illustrates a fourth point in the attack 660 on the cloud infrastructure that comprises two cloud-based environments 662, 664 that is detected using the embodiment of the control-plane event monitoring processor 666 described in connection with FIG. 6A. At this fourth point 660, processes in the first and second cloud environments 662, 664 have evolved as the result of the bad actor now attempting exfiltration of data from the second cloud-based environment 664 using the credentials from the first cloud-based environment 662 obtained in attach point two 620 described in connection with FIG. 6B. This exfiltration activity will not be discoverable by the control plane events originating from the first cloud-based environment 662 because of the disabling that occurred at the third attach point 630 described in connection with FIG. 6C.

Figure 6E:
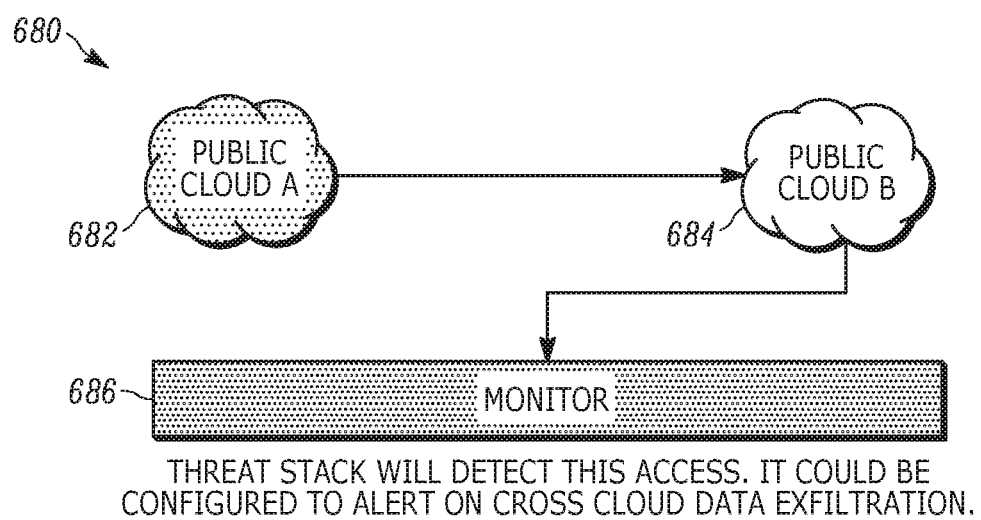
FIG. 6E illustrates a fifth point in the attack on the cloud infrastructure that comprises two cloud-based environments that is detected using and the embodiment of the control-plane event monitoring processor described in connection with FIG. 6A.

FIG. 6E illustrates a fifth point in the attack 680 on the cloud infrastructure that comprises two cloud-based environments 682, 684 that is detected using the embodiment of the control-plane event monitoring processing 686 described in connection with FIG. 6A. At this fifth point 680, the control-plane event monitoring processor 686 detects the access of the bad actor using credentials gained from the first cloud environment 682 at the second point in the attack 620 described in connection with FIG. 6B. The detection of the control-plane event monitoring processor 686 is based on the receiving of control plane events from the second cloud-based environment 684 associated with the exfiltration of data in the second cloud environment 684 and the receiving of control plane events from the first cloud-based environment 682 earlier in the attack sequence. The control plane events from the two different environments were normalized into a common event format so that they could be processed together so as to correlate, or make a connection between, the credential access in the first cloud and the data exfiltration from the second cloud. Known systems would only detect one or the other activity and therefore, not be able to alert managers to the sophisticated cross-cloud-based-environment attack. Thus, the control-plane event monitoring systems and methods of the present teaching are capable of detecting attacks that involve lateral movement across hosts that are in two different service provider domains.

Another example attack that can be identified by some embodiments of the cloud-based control-plane-event monitoring system and method of the present teaching is a bad actor gaining access via access keys and persistent permissions. By way of example, some aspects of this attack are described in the context of an Amazon cloud service, but one skilled in the art will appreciate that application of the system and method to other cloud environments is straightforward. In attacks of this nature, ranging from rudimentary to sophisticated, the bad actor's first step is to gain access using a stolen API keys. Common methods attackers use include, for example, stealing from employee laptops via malware or farming from open-source code websites like GitHub where employees accidentally upload their access keys. Once the bad actor confirms that the access key works, the bad actor typically want to ensure that they can regain access, even if someone in security or operations terminates their stolen access key. To do so, they create new keys, assume a role, or use another method to create a way to regain access. Through collection and ingestion of control plane event data and subsequent processing as described herein, the system is able to alert based on specific API calls associated with access key management such as, for example, creating, disabling, deleting or listing access keys, retrieving the last used access key, creating users, or listing roles.

Once the bad actor successfully enters the environment via infrastructure APIs, the bad actor typically looks to see whether they have direct access to the resources they need, such as an RDS database or S3 bucket. When they discover they do not, they move on to an alternative route. In this case, the actor launches EC2 instances inside the environment, which are as trusted as any other legitimate host on their network. This scenario is one reason why it is dangerous to assume any network connection coming through a firewall or on a subnet is to be trusted. The bad actor has now established a beachhead in the environment's network, allowing them to perform reconnaissance and scan the local area network that they have breached. In these cases, the cloud-based, control-plane-event monitoring system and method of the present teaching can send alerts on API calls including DescribeKeyPairs, DescribeNetworkAcls, DescribeRouteTables, and RunInstances. If the bad actor wanted to stop control plane logging or delete current event logs, they would use API calls such as DeleteTrail, StopLogging, or Update Trail, all of which would be detected by the monitoring scheme. Also, once the attacker launches the EC2 instance, they can access the metadata associated with the instance with a curl/wget call, which would trigger sending an alert.

The bad actor can then proceed to move laterally from the initial rogue EC2 instance, scanning and exploiting as they compromise other hosts in the network. The EC2 instances are granted IAM permissions when they launch, giving them legitimate access to managed services like S3 or RDS. So after each new host was compromised on the network, the bad actor would check its permissions. This activity would trigger Threat Stack host level alerts, such as unexpected process execution, network activity, suspicious commands, software executing out of/tmp, kernel modules being installed, and more.

The bad actor can also land on host with sufficient permissions and extract data from RDS. This is accomplished once on a host with the needed IAM permissions. The bad actor then can perform the necessary RDS API calls to access the database with the target data. If the bad actor only steals a small amount of data, these data can be exfiltrated either directly through the terminal or through their chain of compromised hosts possibly avoiding any data loss prevention tools. Attackers aren't always persisting to dive deeper into the host.

One reason why the type of lateral movement in this attack is often hard to detect is that most known host-level security monitoring techniques assume a bad actor will want to persist deeper into the host and escalate privileges on it. Thus, these known monitoring system create strong controls for these types of behavior on top of decades of Linux/Unix experience. Instead, however, the bad actors were attempting to move off the host layer and back into the infrastructure control plane, an activity that most blue teams are not looking for and that never requires them to become root. As such, the control-pane event monitoring system and method of the present teaching is an important tool to be able to detect these attacks that involve "lateral moves" and activity in a cloud infrastructure that comprises at least two different cloud environments that should be correlated to successfully and/or efficiently detect the attack.

One feature of the present teaching is that the evaluation step is able to generate a threat assessment based on processing of events in the common event data set. Threats are assessed based on various metrics. Because the common event data set includes events from multiple cloud environments, the threat assessment spans multiple cloud environments. Metrics include, for example, a frequency of permission changes, a frequency of type of hardware configuration change, and a frequency of user changes. A threat is determined based on a metric, or combination of metrics exceeding a threshold.

One feature of the present teaching is that vulnerabilities of a cloud based infrastructure comprising more than one cloud environment can be identified. Vulnerabilities can be identified by processing events in the common event data set with data from various published vulnerability databases. For example, the National Vulnerability Database may be used. In addition, intrusion detection, tampering and software compliance can be evaluated using the events in the common event data set.

Another feature of the present teaching is that, because it processes events from multiple control planes in multiple cloud environments, it can reduce noise in the resulting common event data set. This results in better outcomes, including higher integrity and/or more efficient identification of vulnerabilities and threats than is possible using event data from prior art single-cloud event monitors.

Another feature of the present teaching is that it works for applications that utilize containers. The explosion of growth in the use of containers and container orchestration, as well as the increased popularity of abstracted infrastructure like managed containers and server-less infrastructure reflects more flexible and efficient environments. However, as many organizations utilize containers, they lose control and visibility and, consequently security and threat detection suffers. One recent trend in workload management for cloud-based information systems is to encapsulate software applications into containers. The containers are designed to contain only the base software necessary to execute a particular process or application. Containers virtualize access to resources, such as CPU, storage or memory. Containers differ from traditional virtualization technology in that they focused on providing a fully-encapsulated environment that is easy to manage for the execution of specific software, process or applications.

The use of containers is sometimes desirable because they increase compute density by allowing many applications to be deployed on a single virtual server. However, this feature of containers also increases the attack surface. Attackers often compromise a single container and move laterally. That is, one infected container can lead to a chain of events, especially if other containers are configured improperly. Typically, users rely on a heterogeneous cloud infrastructure that includes varying levels of visibility and complexity. In some cases, users integrate security early into, for example, software development and IT operations (DevOps) processes, and avoid compromise of systems in ways that can be difficult to address retroactively. Monitoring of control plane events offers visibility into container aspects, such as starting and stopping of containers, which can be used in an overall system that monitors cloud-based infrastructure that relies on containers. Such control plane event monitoring can complement other monitoring systems, for example, agent-based monitors that provide information on aspects internal to the container, such as CPU, storage and memory usage. Control plane events add valuable information related to the physical hardware in the cloud-based data center infrastructure that supports the containers, for example, rewiring, spin up of new systems, adding of memory, new disks, adding of users, and others.

Another feature of the system and method for control plane event monitoring of the present teaching is that it provides a cloud-native (i.e. designed specifically for the cloud), platform-independent, comprehensive set of monitoring applications. The results of the monitoring method and outputs of the monitoring system of the present teaching can provide synthesized and contextualized data to users relating to events ongoing on their cloud-based infrastructure. In one example, the results and outputs from the system and method aid remediation of cyber threats across a broad spectrum of activities because it can support a comprehensive set of known security applications.

Yet another feature of the system of the present teaching is that it utilizes processing assets distributed in a cloud-based computing architecture in a cost-effective manor. As a result, the system scales in a cost-effective, modular fashion as the monitored information systems grow. This is, at least in part, because the system relies on cloud-based processing resources that can be expanded as the information system demand expands, and reduced when the information system demand wanes. The system also easily accommodates addition of new computer infrastructure management, compliance, security threats and new monitoring applications by supporting a configurable and software-application-based monitoring approach. This is in contrasted to known systems where individual point solutions for security and monitoring require specialized, costly, hardware and provide a smaller suite of security and monitoring applications.

Equivalents

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

We claim:

1. A method for cloud-based, control-plane-event monitoring, the method comprising:
   a) receiving control-plane events from a cloud-based element associated with a first cloud environment, wherein at least one of the received control-plane events comprises a first event type with a first format;
   b) receiving control-plane events from a cloud-based element associated with a second cloud environment, wherein at least one of the received control-plane event comprises a second event type with a second format and wherein the first event type and the second event type are a same event type and the first format and the second format are different formats;
   c) generating a multiple-source data set from the control-plane events from the cloud-based elements associated with the first and second cloud environments;
   d) evaluating the multiple-source data set based on attributes of the first and second cloud environments and transforming the at least one of the received control-plane events comprising the first event type with the first format and the at least one of the received control-plane events comprising the second event type with the second format into at least one common event with a common format, thereby generating a common event data set; and
   e) processing the common event data set using a rule set to generate an outcome.

2. The method for cloud-based control-plane-event monitoring of claim 1 wherein the outcome comprises an alert.

3. The method for cloud-based control-plane-event monitoring of claim 1 wherein the outcome comprises a policy violation.

4. The method for cloud-based control-plane-event monitoring of claim 1 further comprising processing the common event data set to remove noisy normalized data.

5. The method for cloud-based, control-plane-event monitoring of claim 1 wherein the evaluating the multiple-source data set based on attributes of the first and second cloud environments comprises comparing distinct properties of at least two events in the multiple-source data set.

6. The method for cloud-based, control-plane-event monitoring of claim 1 wherein the evaluating the multiple-source data set based on attributes of the first and second cloud environments comprises categorizing a property of a first event in the multiple-source data set into a common event property.

7. The method for cloud-based, control-plane-event monitoring of claim 6 wherein the evaluating the multiple-source data set based on attributes of the first and second cloud environments comprises categorizing a property of a second event in the multiple-source data set into the common event property.

8. The method for cloud-based, control-plane-event monitoring of claim 1 wherein the processing the common event data set using the rule set to generate the outcome comprises processing the common event data set using a threat rule set to generate a threat assessment.

9. The method for cloud-based, control-plane-event monitoring of claim 1 wherein the processing the common event data set using the rule set to generate the outcome comprises processing the common event data set using a vulnerability rule set to generate a vulnerability assessment.

10. The method for cloud-based, control-plane-event monitoring of claim 1 wherein the processing the common event data set using the rule set to generate the outcome comprises processing the common event data set using a compliance rule set to generate a compliance assessment.

11. The method for cloud-based, control-plane-event monitoring of claim 1 wherein at least one of the cloud-based elements comprises a cloud-based computer.

12. The method for cloud-based, control-plane-event monitoring of claim 1 wherein at least one of the cloud-based elements comprises a cloud-based virtual machine.

13. The method for cloud-based, control-plane-event monitoring of claim 1 wherein the receiving control-plane events from the cloud-based element associated with the first cloud environment comprises receiving real-time continuous event information from an operating system kernel in the cloud-based element associated with the first cloud environment.

14. The method for cloud-based, control-plane-event monitoring of claim 1 wherein the receiving control-plane events from the cloud-based element associated with the first cloud environment comprises receiving real-time continuous event information from a containerization platform running on an operating system kernel in the cloud-based element associated with the first cloud environment.

15. The method for cloud-based, control-plane-event monitoring of claim 1 wherein the receiving control-plane events from the cloud-based element associated with the first cloud environment comprises receiving real-time continuous event information from an agent that is running on a same operating system as the cloud-based element associated with the first cloud environment.

16. A system for cloud-based, control-plane-event monitoring, the system comprising:
a) a collection processor having inputs that receive control-plane events comprising a first event type with a first format from a cloud-based element associated with a first cloud environment and that receive control-plane events comprising a second event type with a second format from a cloud-based element associated with a second cloud environment, wherein the first event type and the second event type are a same event type and the first format and the second format are different formats;
b) an ingestion processor that ingests the received control-plane events from the cloud-based elements associated with the first and second cloud environments, thereby generating a multiple-source data set from the control-plane events from the cloud-based elements associated with the first and second cloud environments;
c) an evaluation processor that evaluates the multiple-source data set based on attributes of the first and second cloud environments and that transforms the at least one of the received control-plane events comprising the first event type with the first format and the at least one of the received control-plane events comprising the second event type with the second format into at least one common event with a common format, thereby generating a common event data set; and
d) a processor that processes the common event data set using a rule set to generate an outcome.

17. The system for cloud-based, control-plane-event monitoring of claim 16 further comprising the cloud-based elements associated with the first and second cloud environments.

18. The system for cloud-based, control-plane-event monitoring of claim 17 wherein at least one of the cloud-based elements associated with at least one of the first and the second cloud environment comprises a computer.

19. The system for cloud-based, control-plane-event monitoring of claim 17 wherein the computer comprises a virtual machine.

20. The system for cloud-based, control-plane-event monitoring of claim 17 wherein at least one of the cloud-based elements associated with at least one of the first and the second cloud environment comprises a central processing unit.

21. The system for cloud-based, control-plane-event monitoring of claim 17 wherein at least one of the cloud-based elements associated with at least one of the first and the second cloud environment comprises an array of compute services.

22. The system for cloud-based, control-plane-event monitoring of claim 17 wherein at least one of the cloud-based elements associated with at least one of the first and the second cloud environment comprises an array of storage services.

23. The system for cloud-based, control-plane-event monitoring of claim 17 wherein at least one of the cloud-based elements associated with at least one of the first and the second cloud environment comprises an array of networking services.

24. The system for cloud-based, control-plane-event monitoring of claim 17 wherein at least one of the cloud-based elements associated with at least one of the first and the second cloud environment comprises an array of cloud migration services.

25. The system for cloud-based, control-plane-event monitoring of claim 17 wherein at least one of the cloud-based elements associated with at least one of the first and the second cloud environment comprises load balancing tools.

26. The system for cloud-based, control-plane-event monitoring of claim 17 wherein at least one of the cloud-based elements associated with at least one of the first and the second cloud environment comprises software development tools.

27. The system for cloud-based, control-plane-event monitoring of claim 16 wherein the processor that processes the common event data set using the rule set generates an alert.

28. The system for cloud-based, control-plane-event monitoring of claim 16 wherein the processor that processes the common event data set using the rule set generates a policy violation.

29. The system for cloud-based, control-plane-event monitoring of claim 16 wherein the processor that processes the common event data set using the rule set removes noisy normalized data.

30. The system for cloud-based, control-plane-event monitoring of claim 16 wherein the processor that processes the common event data set comprises a pipeline processor.

31. The system for cloud-based, control-plane-event monitoring of claim 16 wherein the collection processor and the ingestion processor are a same processor.

32. The system for cloud-based, control-plane-event monitoring of claim 16 wherein the collection processor and the evaluation processor are a same processor.

33. The system for cloud-based, control-plane-event monitoring of claim 16 wherein the ingestion processor and the evaluation processor are a same processor.

\* \* \* \* \*